US006897756B2

(12) United States Patent  
Haisch

(10) Patent No.: US 6,897,756 B2
(45) Date of Patent: May 24, 2005

(54) APPARATUS WITH TWO COMPONENTS BEING MOVABLE RELATIVE TO EACH OTHER AND A DEVICE FOR SIMULTANEOUS TRANSFER OF ELECTRIC POWER AND INFORMATION BETWEEN THESE COMPONENTS

(75) Inventor: Erwin Haisch, Aldingen (DE)

(73) Assignee: Sipra Patententwicklungs- und Beteiligungsgesellschaft mbH, Albstadt (DE)

( * ) Notice: Subject to any disclaimer, the term of this patent is extended or adjusted under 35 U.S.C. 154(b) by 23 days.

(21) Appl. No.: 10/620,131

(22) Filed: Jul. 15, 2003

(65) Prior Publication Data

US 2004/0104799 A1 Jun. 3, 2004

(30) Foreign Application Priority Data

Jul. 26, 2002 (DE) ........................................ 102 34 893

(51) Int. Cl.$^7$ ............................................. H01F 21/06
(52) U.S. Cl. ....................... 336/130; 336/132; 336/131; 336/117
(58) Field of Search ........................... 336/83, 117, 121, 336/130, 131, 132, 115, 118

(56) References Cited

U.S. PATENT DOCUMENTS 4,038,625 A * 7/1977 Tompkins et al. ............. 336/83
4,912,684 A * 3/1990 Fowler .......................... 367/76
5,701,121 A   12/1997 Murdoch
5,872,408 A * 2/1999 Rakov ....................... 310/68 B
6,040,986 A   3/2000 Sakamoto et al.
6,075,433 A   6/2000 Ono et al.
6,101,084 A * 8/2000 Rakov ....................... 361/301.2
6,268,785 B1 * 7/2001 Kollman et al. .............. 336/83
6,489,874 B2 * 12/2002 Katsura et al. ............. 336/130

FOREIGN PATENT DOCUMENTS

| DE | 44 12 958 A1 | 10/1995 |
| DE | 196 49 682 A1 | 6/1998 |
| EP | 0 431 674 A1 | 6/1991 |
| EP | 0 539 696 A1 | 5/1993 |
| EP | 1 085 712 A2 | 3/2001 |

* cited by examiner

*Primary Examiner*—Anh Mai  
(74) *Attorney, Agent, or Firm*—Michael J. Striker

(57) ABSTRACT

The invention relates to an apparatus with a device for simultaneous transfer of electrical power and information between two components being movable to each other and preferably comprising a stationary and a movable component. According to the invention the apparatus includes a transfer device for the common transfer of power and information, with a primary coil arrangement (5, 6) mounted on one of the components and a secondary coil arrangement (11) mounted on the other component, a power supply (35, 41, 59) connected to the primary coil arrangement (5, 6) and based on pulse width modulation, and means (71, 72) for modifying signals generated by the power supply in dependence on the information to be transferred. The information can be transferred both from the one component to the other component and vice versa (FIG. 6).

15 Claims, 12 Drawing Sheets

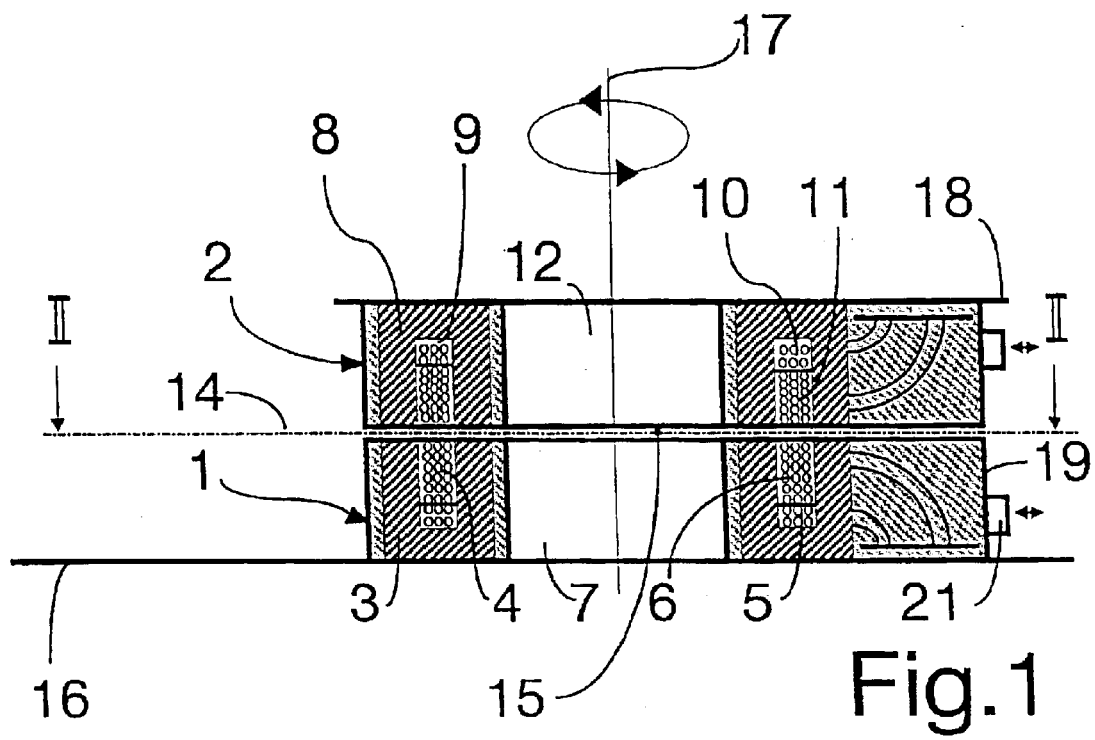
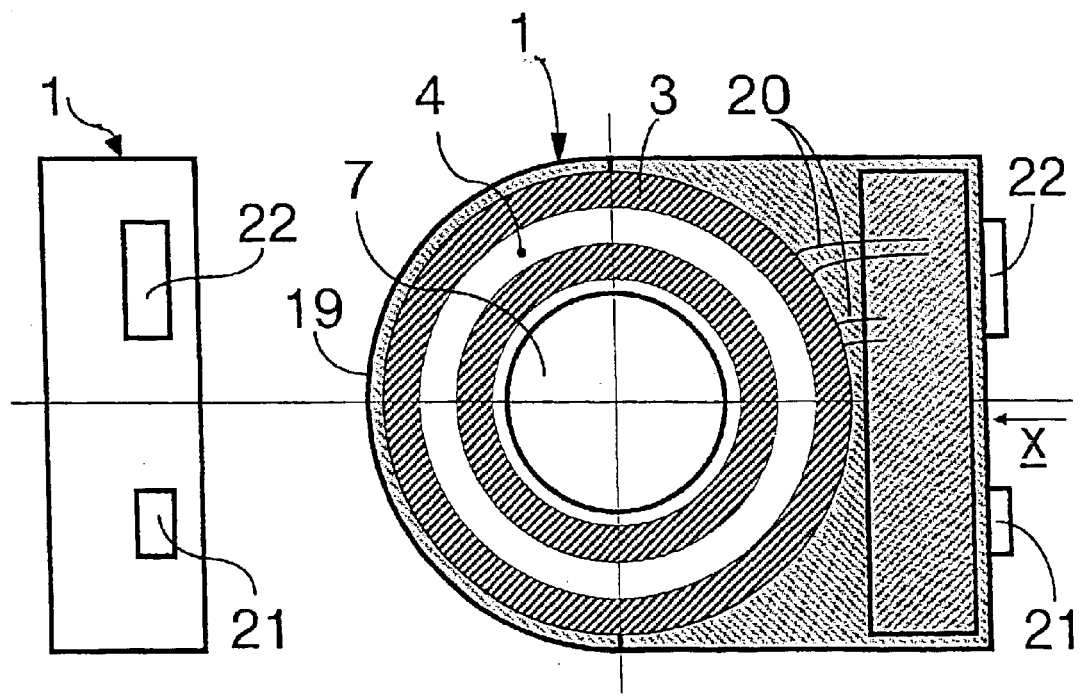
Fig. 1
Fig. 3  Fig. 2

APPARATUS WITH TWO COMPONENTS BEING MOVABLE RELATIVE TO EACH OTHER AND A DEVICE FOR SIMULTANEOUS TRANSFER OF ELECTRIC POWER AND INFORMATION BETWEEN THESE COMPONENTS

FIELD OF THE INVENTION

This invention relates generally to an apparatus with two components and a device for simultaneous transfer of electric power and information between the components through contact-free, inductive coupling.

BACKGROUND OF THE INVENTION

It is frequently necessary in apparatuses with a stationary component and a component movable relative thereto to transfer electric power and information or data, e.g. present in the form of digital electric signals, from the stationary component to the movable component and vice versa. In the case of circular knitting machines it is for example known (EP 0 431 674 A1) to select selector magnets for the knitting needles mounted on a rotary needle cylinder on the one band in accordance with a pattern, with the aid of information which is transferred without contact from a stationary component to the needle cylinder, while on the other hand the electric power needed for operating the selector magnets is transferred with the aid of slip rings.

In addition it can be necessary, especially with complex, largely automatically operated circular knitting machines, to transfer data from a stationary control unit to a component coupled to a rotary needle cylinder and rotatable together with this, e.g. a take down and winding up device, in order for example to establish preselected take down tensions. In such cases it is frequently also desired to transfer measurement data, which is generated by sensors, processors or the like located on the rotatable part, to the stationary control unit, where this measurement data can serve for example to monitor machine states or be used as actual values in regulating devices. Devices are already known (EP 1 085 712 A2) for such bidirectional data transfer, which operate through an inductive and contact-free coupling between a stationary component and a rotatable component. The transfer of electric power has however to be effected in the usual way with the aid of slip rings.

Apparatuses of the kind initially specified are further known (DE 44 12 958 A1), which comprise means for inductive, contact-free transfer both of electric power and of electric information. To transmit data between a transmitter module and a receiver module the one module is provided with an electrical line terminated reflection-free at the end, while the respective other module is formed as a sensor inductively coupled to the line. On the other hand the transfer of power is effected by means of a coupling loop connected to a power source, separate from the said line and coupled to a load to be supplied through a transformer.

Finally apparatuses of the kind initially specified are known (DE 196 49 682 A1) which also do have a line terminated reflection-free, in which however the power and information transfer is possible over this one line. The transfer of data is here effected at comparatively high frequencies from about 10 MHz, compared with frequencies of up to 100 kHz for the power transfer. A common transmission line is thus in fact present in use of such an apparatus. However two separate systems are also needed for the transfer of power and information.

The first-mentioned apparatuses require slip rings for the transfer of power, or trailed cables, as is known in flat bed knitting machines for example. Neither of these is always desirable on account of the resulting constructional limitations and the unavoidable wear. The latter cited apparatuses on the other hand do have the advantage of contact-free transfer of power and information but also involve a constructional outlay which is not insubstantial, which hinders their use in circular and flat bed knitting machines for reasons of cost. The same applies for other textile machines, especially circular braiding machines with rotatable rotors.

OBJECTS OF THE INVENTION

It is a general object of the present invention to provide an apparatus for transferring energy and information from a first, preferably stationary device to a second, preferably movable device. A more specific object of the present invention is to so design an apparatus of the kind mentioned above that a contact-free transfer of power and data can be effected with constructionally simple means.

Yet another object of the present invention is to so design an apparatus of the kind mentioned above that power and data can be transferred from one component, preferably a stationary component, to another component, preferably a movable component.

Still another object of the present invention is to provide an apparatus with two components being movable relative to each other and with a device for simultaneous transfer of electric power and information between the components in such a manner that the same means can at least in part be used for both kinds of transfer.

SUMMARY OF THE INVENTION

These and other objects are solved in accordance with the present invention by means of a device which includes a common transfer device for transfer of the power and the information with a primary coil arrangement mounted on one component and a secondary coil arrangement mounted on an other component, a power supply which is connected to the primary coil arrangement, is based on pulse width modulation and is operated at a predetermined clock frequency and with a predetermined duty cycle, and means for modifying the signals generated by the power supply in dependence of the information to be transferred.

The invention contributes the advantage that a conventional power supply part based on pulse width modulation (=PWM) is used in combination with a transfer device formed in the manner of a transformer both for energy or power transfer and transfer of information or digital data. Both kinds of transfer can thus be realised over a common channel without substantial additional expense and in a manner which is so interleaved that data can be transferred in both directions simultaneously with the power. Moreover integrated PWM circuits are available on the market in large numbers and in many variants, so that the complete apparatus can be manufactured comparatively inexpensively.

Further advantageous features of the invention appear from the dependent claims.

BRIEF DESCRIPTION OF THE DRAWINGS

The invention will be explained in more detail below by way of an example, in conjunction with the accompanying drawings, in which:

FIG. 1 is a cross-section through an inductive transfer device of the apparatus according to the invention;

FIG. 2 is a section along the line II—II of FIG. 1;

FIG. 3 is side view of the transfer device in the direction of an arrow x in FIG. 2;

DETAILED DESCRIPTION OF THE DRAWINGS

Figure 4:
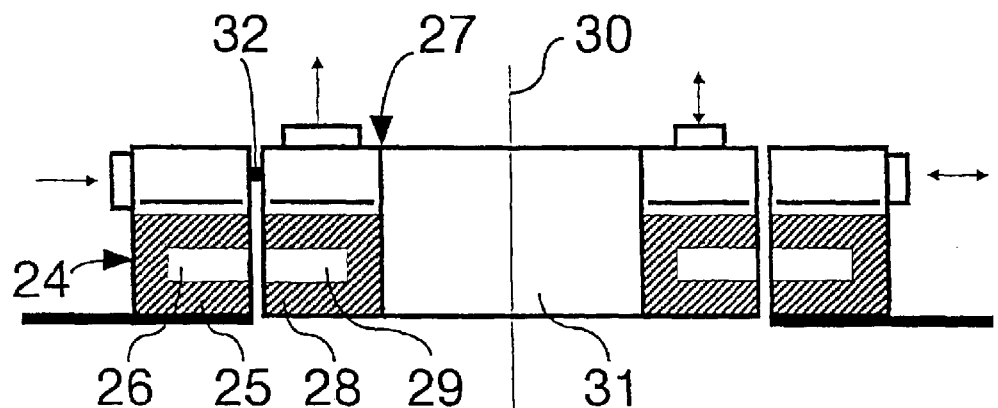
FIG. 4 is a cross-section through a second embodiment of an inductive transfer device of the apparatus according to the invention.

FIGS. 1 to 3 show schematically a transfer device of an apparatus according to the invention formed in the nature of a transformer. The transfer device includes a primary coil arrangement 1 and a secondary coil arrangement 2.

The primary coil arrangement 1 includes a first core half 3 of a high-grade, rapidly reversibly magnetisable material, such as a ferrite for example, which is suitable for high frequencies. The core half 3 consists in the embodiment of a circular disc of annular form, in which a circumferential groove 4 serving as a winding space is sunk in from one broad side. An auxiliary winding 5 extending down to its bottom is disposed on this groove 4, with a main winding 6 above it. The individual turns of the two windings 5 and 6 extend circularly round a central mounting opening 7 of the core half 3.

The secondary coil arrangement 2 includes a second core half 8, which is preferably formed of the same material and with the same kind of structure as the first core half 3. Thus the second core half 8 includes an annular groove 9, in which there lie auxiliary and main windings 10, 11 one on the other, and a central mounting opening 12.

The two core halves 3, 8 are arranged in the apparatus according to the invention in mirror symmetry to a plane of separation 14, so that those broad sides in which the grooves 4 and 9 are sunk lie coaxially opposite one another but are separated from one another by a narrow air gap 15. The two core halves 3 and 8 thus form the core of a transformer, separated along the air gap 15, with the particular feature that the one core half (e.g. 3) is fixed to a stationary component 16, while the other core half (e.g. 8) is fixed to a component 18 which can rotate about an axis of rotation 17. The stationary component 16 is a frame part for example and the rotatable component 18 is the needle cylinder for example or an element of a circular knitting machine which rotates therewith.

The core halves 3, 8 are each fitted in a housing 19, while the windings 5, 6 and 10, 11 are connected by schematically indicated terminals 20 to components explained in more detail below and each fitted in a housing part arranged beside the core halves 3, 8. The components are moreover connected as required to plug connectors 21 and 22, which serve for connection to electric voltage sources, electric signal or data lines or the like.

Figure 5:
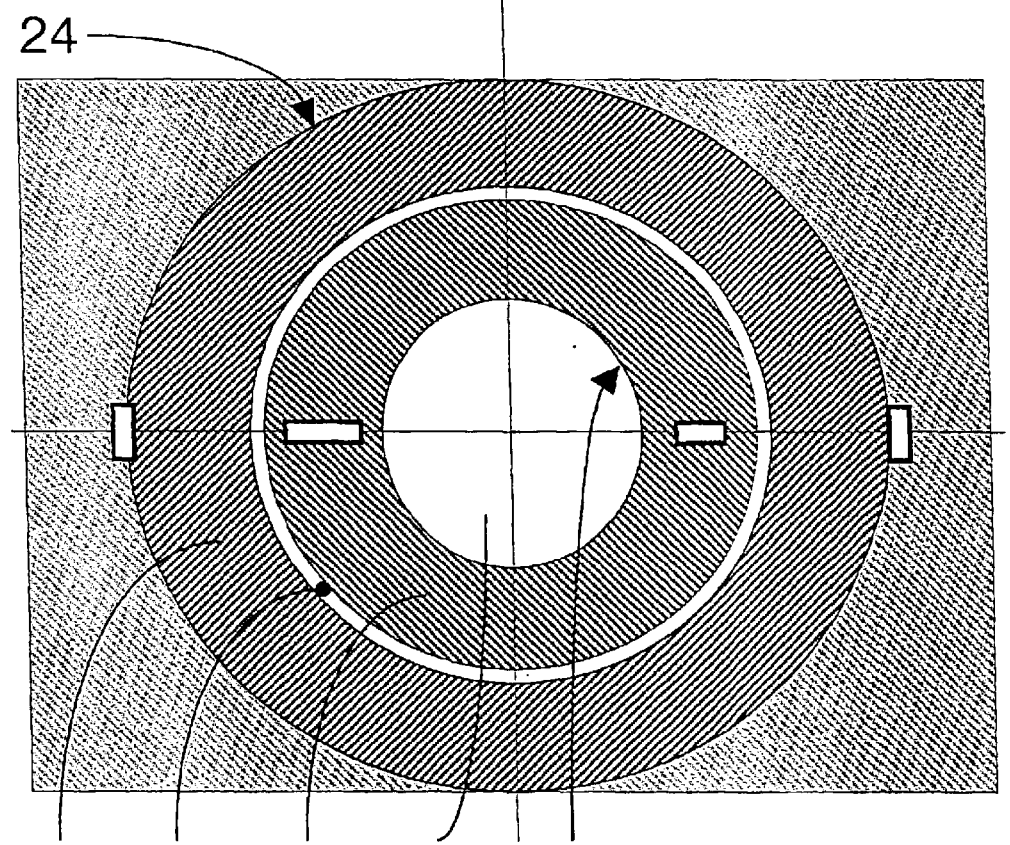
FIG. 5 is a plan view of the transfer device according to FIG. 4.

An alternative embodiment of the transfer device according to the invention is shown in FIGS. 4 and 5. A stationary primary coil arrangement 24 includes a first core half 25 which is of circular shape and has a groove 26 which is formed in its radially inner circumferential surface. On the other hand, a rotatable secondary coil arrangement 27 includes a second core half 28 which also consists of a circular disc and has an outer diameter which is slightly smaller than the inner diameter of the core half 25. The core half 28 is moreover provided with a groove 29 which is sunk in its radially outer peripheral surface. In contrast to FIGS. 1 to 3, the second core half 28 lies in the mounted state coaxial to an axis of rotation 30 in a central opening 31 of the first core half 25, so that the two grooves have their open sides opposed (FIG. 4) and the two core halves 25, 28 are separated from one another by an air gap 32 coaxial with the axis of rotation 30. The secondary coil arrangement 27 can therefore be turned about the axis of rotation 30 relative to the primary coil arrangement 24. The windings of the transfer device corresponding to the windings 4, 5 and 10, 11 of FIGS. 1 to 3 are not shown in FIGS. 4 and 5 for the sake of simplicity.

With regard to the transfer of energy (or power) and information (data or signals), the same applies as for the transfer device according to FIGS. 1 to 3 since in both cases the primary and secondary coil arrangements 1, 2 and 24, 27 respectively are inductively coupled together in the manner of a transformer in all conceivable rotary positions of the second core half 8 or 28. In the case of FIGS. 1 to 5 the second core halves 8 or 28 can naturally be stationary and the first core halves 3 or 25 rotatable.

Figure 6:
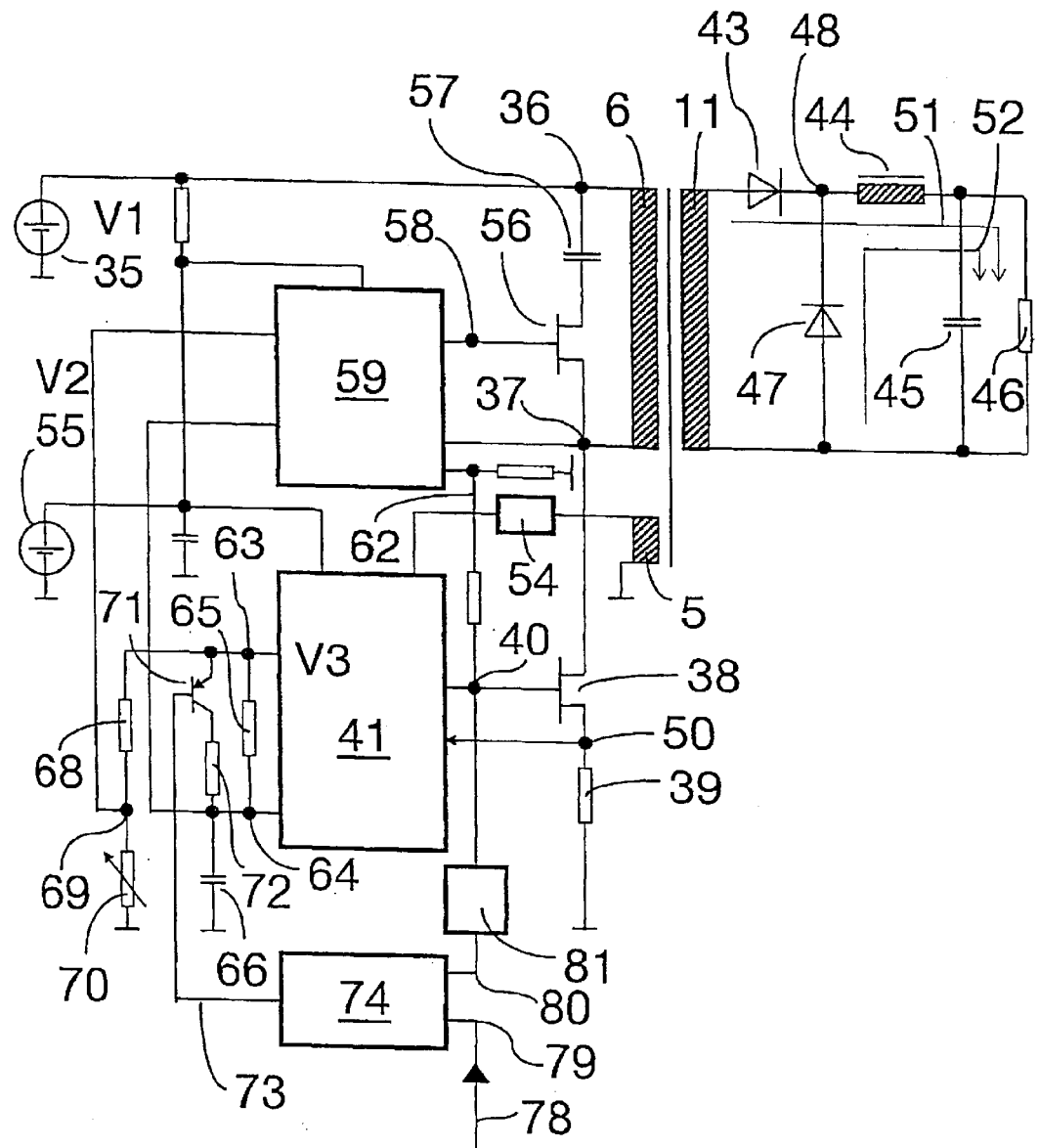
FIG. 6 shows an embodiment of the apparatus according to the invention with reference to a block circuit diagram, with partial omission of a transfer device according to FIGS. 1 to 5.
Figure 7:
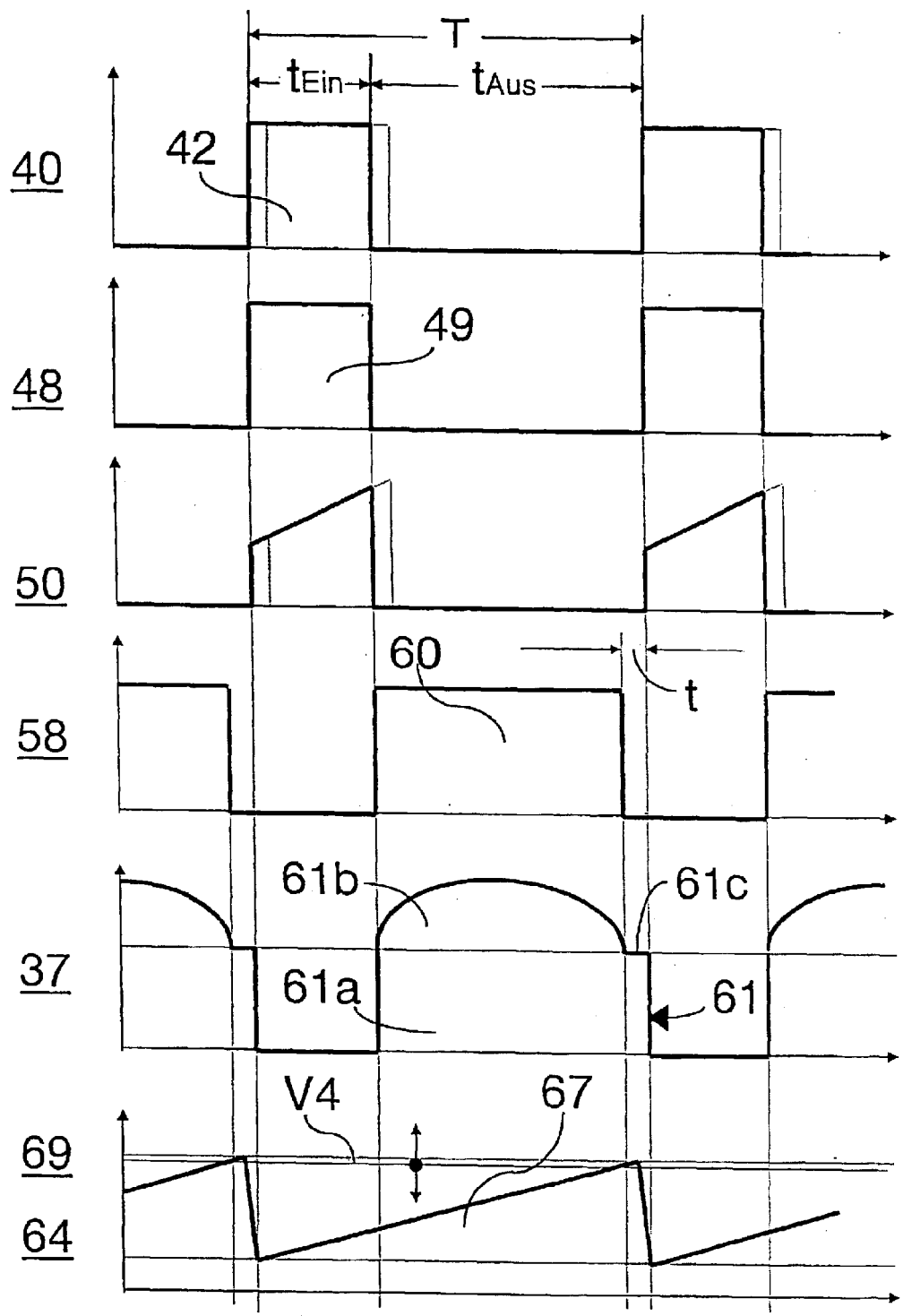
FIGS. 7 to 9 show pulse waveforms at selected nodes of the apparatus according to FIG. 6.

FIGS. 6 and 7 show an apparatus according to the invention for transferring power from a fixed component, which is represented in FIG. 6 by the main winding 6 and the auxiliary winding 5 of the primary coil arrangement 1 (FIG. 1), to a rotatable component represented by the main winding 11 of the secondary coil arrangement 2 (FIG. 1).

The apparatus includes a DC voltage source 35 which delivers a DC voltage V1 of about 50 V for example and whose positive terminal is connected to a node 36 of the main winding 6. The negative terminal of the voltage source 35 is at ground. A second node 37 of the main winding 6 is corrected through a series circuit of an electric switch 38, e.g. a switching transistor, and a resistor 39, to ground potential. A control input of the switch 38 is connected to an output 40 of a PWM (pulse width modulation) controller 41 known per se. Pulses or switch signals 42 in the form of rectangular pulses (FIG. 7) appear at the output 40, with a selected clock frequency which can be changed in this embodiment (e.g. about 40 kHz to 100 kHz), and with a correspondingly variable period T, respectively. The switch signals moreover each have a width $t_{on}$ which determines the switched-on durations of the switch 38. During the pauses with a length $t_{off}$ between two switch signals 42 the switch 38 is off. The period $T=t_{on}+t_{off}$ determines the PWM controller 41 cycle length.

A first terminal of the main winding 11 of the secondary coil arrangement 2 (FIG. 1) is connected to a second terminal of the main winding 11 through a first diode 43, a storage inductor 44 and a capacitor 45. A load 46, which is here shown as an ohmic load, lies in parallel with the capacitor 45. Finally a second diode 47 is provided, with its anode connected to the second terminal of the main winding 11 and its cathode connected to a node 48 between the first diode 43 and the storage inductor 44. During the phases $t_{on}$ of the switch 38, voltage pulses 49 (FIG. 7) are therefore generated at the node 48 with a shape which corresponds to the shape of the switch signal 42. Current moreover flows to a node 50 between the switch 38 and the resistor 39 and has essentially a sawtooth waveform during the switched on duration $t_{on}$ on account of the presence of the main winding 6. The node 50 can be connected to the PWM controller 41 and serve to switch it off should the current through the main winding 6 exceed a critical value.

The PWM controller 41 forms with the voltage source 35 a customary PWM-based power supply unit, i.e. a so-called switched mode power supply, but in contrast to known applications, the electric power delivered by the power supply is fed to the load 46 via the transformer formed by the two windings 6, 11, this load being mounted together with the secondary coil arrangement on the rotatable component 18 (FIG. 1). As in a normal PWM controller, electric energy in the storage inductor 44 is accordingly stored during the phases $t_{on}$ of the switch 38 in the capacitor 45, because with the diode 47 in the blocked state a current flows through the diode 43 and the storage inductor 44, in accordance with the arrow 51 in FIG. 6, whereas during the phases $t_{off}$ of the switch 38, the stored energy can now flow away through the second diode 47 with the diode 43 now in the blocked state (arrow 52 in FIG. 6). The arrangement is advantageously such that the diode 43 is only briefly conducting and the main part of the current flowing therethrough has already decayed when the diode 47 becomes conductive.

The pulse waveforms of the switch signals 42 are moreover indicated in FIG. 7 by broken and dotted lines for the cases in which the powers to be transferred are smaller and larger respectively than in the states shown in full lines. The dotted lines for the switch signals 42 and the currents at the node 50 represent the maximum power to be transferred, from which it is apparent that even at maximum power, the duty cycle formed by the quotient $t_{on}/T$ is comparatively small and is preferably less that 0.5 and preferably amounts to about 0.25 for example.

Finally power supplies of the kind described are normally regulated in such a manner that, as the load 46 becomes bigger or smaller, the duty cycle $t_{on}/T$ is automatically adapted to this, in order to keep the voltage at the load 46 constant. The voltage on the load 46 is normally used as the actual value for this purpose and is compared with a set point value in the PWM controller 41 and held at a constant value by corresponding alteration of the value $t_{on}$ of the switch signals 42. Since the load 46 is mounted in the embodiment on a rotatable component, its voltage cannot be directly fed back to the PWM controller 41.

In accordance with the invention the auxiliary winding 5 of the primary coil arrangement 1 (FIGS. 1 and 6) serves for this purpose, its one terminal lying at ground and its other terminal being connected to an actual value input of the PWM controller 41 through a rectifier circuit 54, which can consist essentially of components corresponding to the components 43, 44, 45 and 47. Since the windings 6, 11 and 5 lie according to FIG. 1 on the same core 3, 8, a voltage drop in the main winding 11 results in a corresponding voltage change in the auxiliary winding 5 Accordingly changes in the load in the secondary circuit are reflected in the output signal of the auxiliary winding 5, so that this is suitable for the desired regulation. The voltage supply for the PWM controller 41 is moreover effected with the aid of a DC voltage source 55 for example, whose voltage V2 amounts to about 14 V for example.

The circuit seen in FIG. 6 further requires dissipation or annihilation of the energy stored during the phases $t_{on}$ in the main winding 6 of the primary coil arrangement. This is effected with the aid of a second electric switch 56 (FIG. 6), e.g. formed as a transistor switch, which forms a series circuit with a capacitor 57 lying between the nodes 36 and 37. The control terminal of the switch 56 is connected to a control output 58 of a control circuit 59. A switch signal 60 always appears on this control output 58, according to FIG. 7, whenever the switch signal 42 of the switch 38 is switched to the off or blocking state. The position of the rear, negative flank of the switch signal 42 corresponds to the position of the leading, positive flank of the switch signal 60. The voltage supply of the control circuit 59 is effected with the aid of the voltage source 55.

The result of switching on the switch 56 is that the previously charged main winding 6 discharges. On account of the normal behaviour of inductances, a back voltage (back EMF) arises at the node 37 when switching off the switch 38; this can be substantially greater than the voltage V1 of the voltage source 35 and therefore must be limited, so that no dangerous excess voltages arise in the switching off operation, which could damage the switch 38 for example. In order to achieve this and at the same time ensure that the back voltage has been completely dissipated at the beginning of the next $t_{on}$ phase, the capacitance of the capacitor 57 and the switched-on duration of the switch 56 are so selected that the behaviour of signals 61 seen in FIG. 7 results at the terminal 37. The signals 61 are composed of a component 61a corresponding to the voltage V1 and a component 61b caused by the back EMF, which has completely disappeared at the latest on switching off the switch 56.

In order that the switch signals 61 only ever occur under any conceivable circumstances at the same time as or shortly after the negative flanks of the switch signals 42 and short-circuits through the switches 38, 56 are avoided, the output 40 of the PWM controller 41 is connected through a line 62 to the control circuit 59. The switch signals 60 at the control output 58 are thus only enabled when the negative flanks of the switch signals 42 from the control circuit 59 have been detected. This applies regardless of how large the switched-on times $t_{on}$ for the switch 38 each time are.

For the same reasons it is desirable to select the switch-off points for the switch 56, or the positions of the negative flanks of the switch signals 60 at the control output 58, in such a manner that it is ensured under any conceivable circumstances that the switch 56 is in the blocked state again on renewed switchin-on of the switch 38. This could be achieved for example in that the switch signals 60 are given a predetermined (constant) width which is smaller than corresponds to the value $t_{off}$ even with the largest permissible pulse width $t_{on}$ of the switch signals 42. This can be seen in FIG. 7, where a short signal section 61c follows the signal section 61b caused by the back-EMF, with a width t so selected that the switch 56 is always switched-off in good time, regardless of whether the switching-on operation of this switch 56 has been started with the rear flank of the switch signal 42 indicated in broken or dotted lines. However, the width t of the signal section 61c would be independent of the pulse width $t_{on}$ and fixedly prescribed.

In order that the interval of time t can be made as small as possible and if desired be adapted to changing conditions, which are also linked to the data transfer explained further below, the power supply is provided in accordance with the invention with means which make it possible to adjust the interval t. According to FIG. 6 two outputs 63 and 64 of the PWM controller 41 are connected together through a resistor 65, while the output 64 is at the same time connected to ground through a capacitor 66. A reference voltage V3 generated in the usual way in the PWM controller 41 appears on the output 63 while the output 64 serves to set the internal clock frequency of the PWM controller 41 and issue a clock signal at the same time. This takes place in that the capacitor 66 is charged through the resistor 65 in sawtooth manner on application of the reference voltage V3 at the output 63 and is discharged again on reaching a threshold value determined in the PWM controller 41. A sawtooth signal 67 thus obtained on the output 64 is shown in FIG. 7 and is moreover fed to an input of the control circuit 59. By suitable dimensioning of the resistor 65 and the capacitor 66 the frequency and thus also the duration of the period T of the internal clock of the PWM controller 41 is thus determined, with the result that the switch signal 42 on the output 40 has the same frequency and period T as the signal 67. The negative flank of the switch signal 42 is created after elapse of the interval of time $t_{on}$, as described by the regulation by means of the auxiliary winding 5.

According to FIG. 6 an input 69 of the control circuit 59 is also connected through a resistor 68 to the output 63. This input 69 is also connected to ground through an adjustable resistor 70. The series circuit of the two resistors 68 and 70 represents a voltage divider for the reference voltage V3 present on the output 63. The DC voltage V4 obtained from the voltage division and shown in FIG. 7 is compared with the sawtooth signal 67 with the aid of a comparator or the like, and whenever the amplitude of the sawtooth signal 67 matches the DC voltage V3 on the input 69, the negative flank of the switch signal 60 (FIG. 7) appearing on the output 58 is created by the control circuit 59. The location of this negative flank can be changed at will by adjustment of the resistor 70 and be so selected that the width t of the signal section 61c of the back FMF in the signal 61 is as small as possible, so that the back EMF is dissipated within as wide as possible a signal section 61b and damaging excess voltages are therefore reliably avoided. In other words, the positive flank of the signal 61 is determined by the negative flank of the switch signal 42 and the negative flank of the signal section 61b by the point of intersection of the voltages V4 and 67.

According to a further particular feature, the described switched mode power supply is so arranged in accordance with the invention that it is possible to alter not only the duty cycle $t_{on}/T$ but also the frequency or the period T of the switch frequency can be altered and set in the preferred embodiment to two different values. To this end a series circuit of a third electric switch 71 and a further resistor 72 is connected according to FIG. 6 in parallel with the resistor 65. The control input of the switch 71 is connected through a control line 73 to a circuit 74, whose significance is explained below. When a switch signal is applied over the control line 73 to the switch 71, this results in parallel connection of the resistors 65 and 72 and a reduction in the parallel circuit formed by the resistors 65, 72 results.

Accordingly the capacitor 66 is charged more quickly each time than in the absence of the resistor 72 and the internal threshold of the PWM controller 41 is attained correspondingly earlier The result of this is that the period T of the sawtooth clock signal 67 (FIG. 7) is reduced, i.e. the frequency of this signal is increased, which equally means that the frequency of the switch signal 42 for the switch 38 is correspondingly increased. At the same time the switched-on time $t_{on}$ of the switch 38 is automatically somewhat reduced by the PWM regulation of the voltage on the load 46 with the aid of the auxiliary winding 5, in order to transfer the same power under otherwise the same conditions.

The change in frequency of the signal 67 finally also has the result that the switch-off instants for the switch 56 occur correspondingly earlier, i.e. they are automatically matched to the increased frequency. Accordingly a change of frequency by means of the switch 71 or the resistor 72 has no significant influence on the interval of time t in FIG. 7. Rather, any possible changes in frequency effect automatic adaptation.

The transfer of information or data from the fixed component 16 to the rotatable component 18 (FIG. 1) is effected in accordance with the invention in the manner described below. The concepts "information" and "data" are to be understood in the most general sense, as also in the data transfer from the rotatable component 18 to the fixed component 16, although in practical cases only the transfer of logical "0" and "1" signals, which are arranged in any serial bit pattern, is involved as a rule, as in the embodiment.

The data to be transferred is supplied in FIG. 6 serially over a line 78, which is connected by means of a suitable interface (e.g. a normal RS 232 serial interface) to the stationary output of a PC, a machine controller for a circular knitting machine or the like. The supply of the data or "0" and "1" signals is effected at a baud rate of 7800 bits/s for example, i.e. at a frequency which is smaller than the frequency of the switch signals 42.

The data is first supplied to an input 79 of the circuit 74, which has a second input 80. This is connected via a block 81 to the output 40 of the PWM controller 41. The block 81 serves to convert the switch signals 42 at the output 40 into signals 82 (FIG. 8) suitable for the data processing, with a suitably lower level. The data to be transferred and arriving on the input 79 are also shown schematically by a signal train 83, in which a signal at a high level H signifies a logical "1" and a signal at a low level L a logical "0". The data can be arranged in any arbitrary code or symbol form and include start and stop bits, parity bits, etc. The data input moreover takes place asynchronously.

The data appearing on the input 79 and the signals 82 appearing on the input 80 are examined in the circuit 74, e.g. by means of an AND function. If the signal train 83 is at the level L at the instant of the positive flank of a signal 82, this is recognised as a logical "0" and an output 84 of the circuit 74 (FIGS. 6 and 8) is set to L, as is indicated at the points 85 in FIG. 8 for example. As a result the switch 71 in the form of a PNP transistor for example is held in its switched-on or conducting state, so that both resistors 65 and 68 are effective and the PWM controller 41 operates with the higher frequency or shorter period T.

Figure 8:
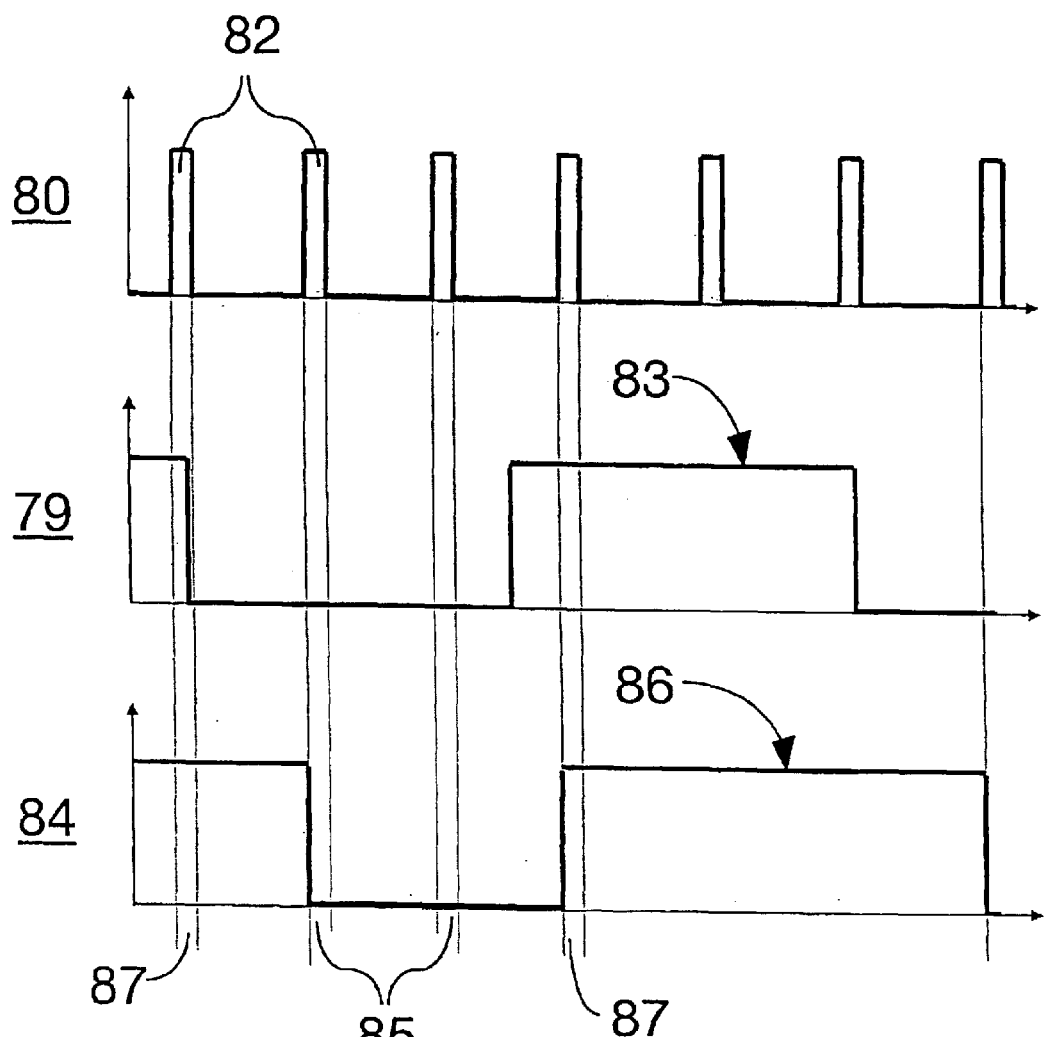

If however the signal train 83 is at the level H on appearance of a signal 82, this is recognised as a logical "1" and the output 84 of the circuit 74 is set to H (signal 86 in FIG. 8), whereby the switch 71 is switched through the control line 73 into the blocked or non-conducting state, as is indicated in FIG. 8 at the points 87. Accordingly only the resistor 65 is now effective, so that the period T of the switch signal 42 for the switch 38 is increased, with the result that the next switch signal 42 or the next signal 82 already appears delayed by an interval which corresponds to the correspondingly increased period T of the switch signal 42. This is result of the sawtooth signal 67 (FIG. 7), which has been started at the beginning of the switch signal 42, now has a longer period T, on account of the longer charging time of the capacitor 66. The switched-on duration of the switch 56 is thus automatically prolonged with the aid of the sawtooth signal 67 and the voltage on the input 69. When the signal On the output 84 is reset to L at any instant and at the beginning of a switch signal 42, the switch signal 42 automatically regains the short period T, on account of the switching-off of the switch 71.

Figure 9:
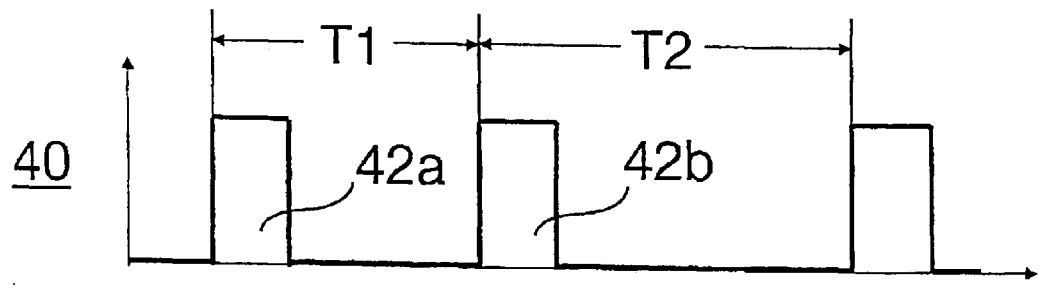

The alteration of the frequency or the period T of the switch signal 42 achieved in the described manner is shown enlarged in FIG. 9. The recognition of a logical "0" in the circuit 74 corresponds to a high frequency with a short period T1 of a switch signal 42a. If however a logical "1" is recognised, the frequency of a switch signal 42b is reduced, i.e. its period is increased to the value T2. This alteration of the switch signal 42 of the PWM controller 42 in dependence on the data to be transferred is so selected in the embodiment that T1=24.7 µs and T2=27.6 µs for example. Thus the logic circuit 74 represents a means mounted on the stationary component for modifying the clock frequency or the period T of the switched mode power supply in dependence on the information to be transferred from the stationary component to the rotatable component.

In accordance with the invention the rotatable component comprises means for recovering the information from the modified switch signals 42, which are formed in the manner seen in FIG. 7 and are nearly identically imaged at the node 48 (FIG. 6) of the secondary circuit. According to FIG. 10, in which the like parts are given the same reference numerals as in FIG. 6, these means comprise a counter 88 and an evaluating unit 89 connected to its output. A switch input 90 of the counter 88 is connected to the node 48 in FIG. 6, while a count input of the counter 88 is connected to a clock generator 91, which generates clock signal with a substantially greater frequency (e.g. 16 MHz) than the frequency of the switch signals 42.

Figure 10:
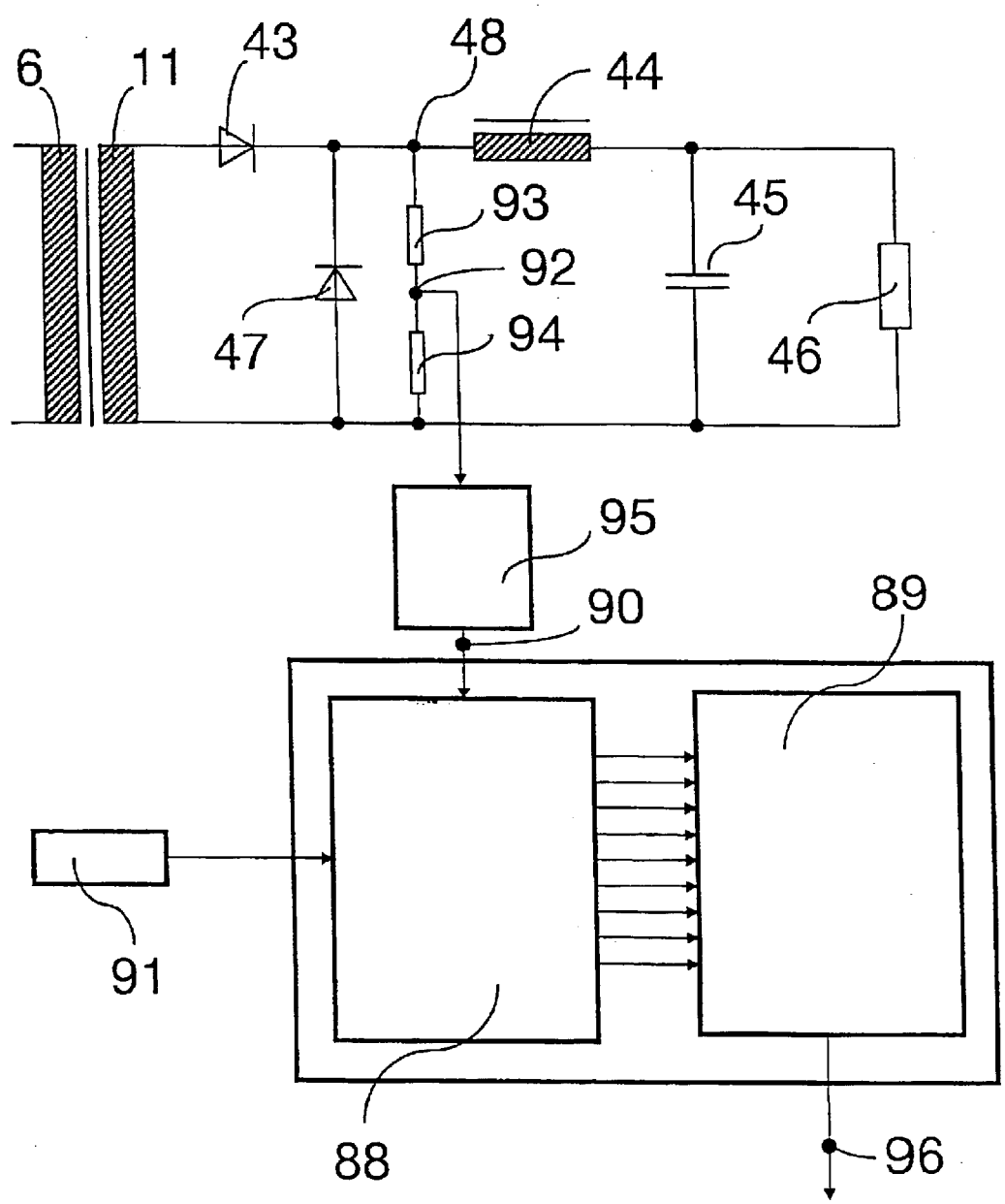
FIG. 10 shows a circuit, omitted in FIG. 6 to simplify the representation, for recovering data which has been transferred by the apparatus according to FIG. 6 from a stationary component to a movable component.

As FIG. 10 further shows, a reduced voltage is preferably fed to the input 90 of the counter 88, rather than the voltage appearing at the node 48. This reduced voltage is on the one hand picked off at a node 92 between two resistors 93, 94 connecting in series, which form a voltage divider, which is connected in parallel with the second diode 47 in FIG. 6. On the other hand this voltage is reduced by a block 95 corresponding to the block 81 in FIG. 6 to a level suitable for the logical data processing and is fed to the switch input 90 in this processed form. In relation to the period, these signals do not alter in comparison with the node 48 and the output 40 of the PWM controller 41.

The counter 88 is reset by each positive flank of a pulse 49 or the voltage at the node 92 and is simultaneously restarted. The clock pulses of the clock generator 91 counted thereafter accordingly lead each time to counter states which depend on the periods T1 and T2 of the switch signals 42a, 42b in FIG. 9 or the corresponding periods of the signals at the nodes 48 or 92. With a clock frequency of 16 MHz this means that, in the above example a period of 24.7 µs would correspond to a counter state of about 395 and a period of 27.6 µs to a counter state of 442. The evaluating unit 89 can therefore be so set up that it issues a logical "0" at an output 96 for a counter state of less than 418 and a logical "1" for a counter state of more than 418.

Figure 11:
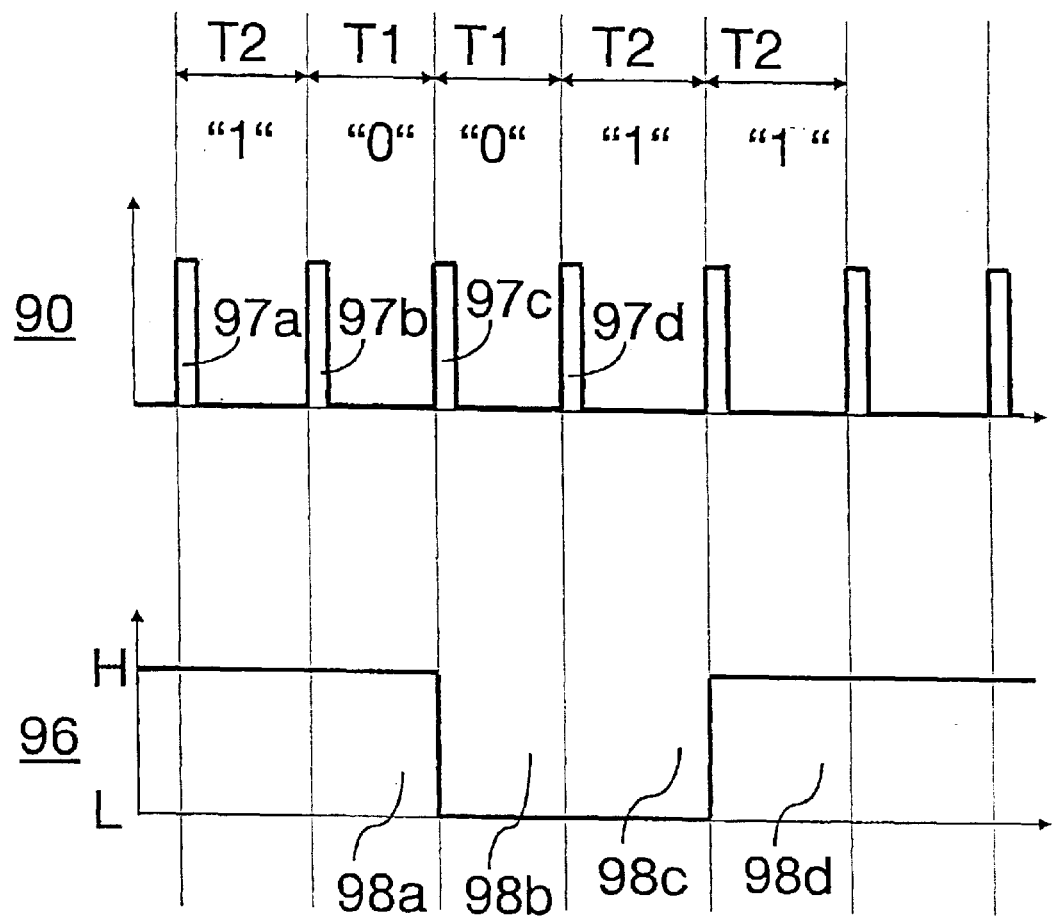
FIG. 11 shows pulse waveforms at selected nodes of the circuit according to FIG. 10.

The signals at the input 90 of the counter 88 and at the output 96 of the evaluating unit 89 are shown in FIG. 11. According to this, a first signal 97a on the input 90 results in a state H at the output 96, which is indicated in FIG. 11 by a signal section 98a. A signal 97b at the input 90 leads however to a state L at the output 96 (signal section 98b). The like applies for a signal 97c at the input 90 (signal section 98c at the output 96). Finally a signal 97b results in a signal state H (signal section 98d) at the output 96. A comparison between the signals 97 and 98 shows that they are displaced by one period relative to one another. This is caused for example in that the period T1 for example of the signal 97b must first have elapsed before the counter state is established, which decides through the evaluating unit 89 whether a logical "0" or a logical "1" is here present. Correspondingly the signal 97d leads to the result that the state H at the output 96 must be associated therewith only after expiry of the corresponding period T2. Since this displacement by about one period applies to all signals on the output 96 however, the data sequence at the output 96 represents a true equivalent of the data or bit sequence shown in FIG. 8, appearing at the input 79 of the circuit 74.

Thus, in accordance with the invention, the same inductive transfer device as for the power transfer is used for the data transfer from the stationary component to the rotatable component, in that the switch signals 42 of the PWM controller 41 or the switched mode power supply are modified according to a kind of frequency modulation. Since the data stream is transferred asynchronously by this, the described displacement at the output 96 of FIG. 10 is not significant. The positions of start and stop bits which may be present in the data stream remain unchanged. Apart from this the changes in the secondary circuit caused by the data transfer are not significant, because they have no significant effect on the power transfer to the load 46.

The transfer of information or data from the rotatable component 18 to the stationary component 16 is effected in accordance with the invention in the manner described below, which also in particular concerns the transfer of "0" and "1" signals.

Figure 12:
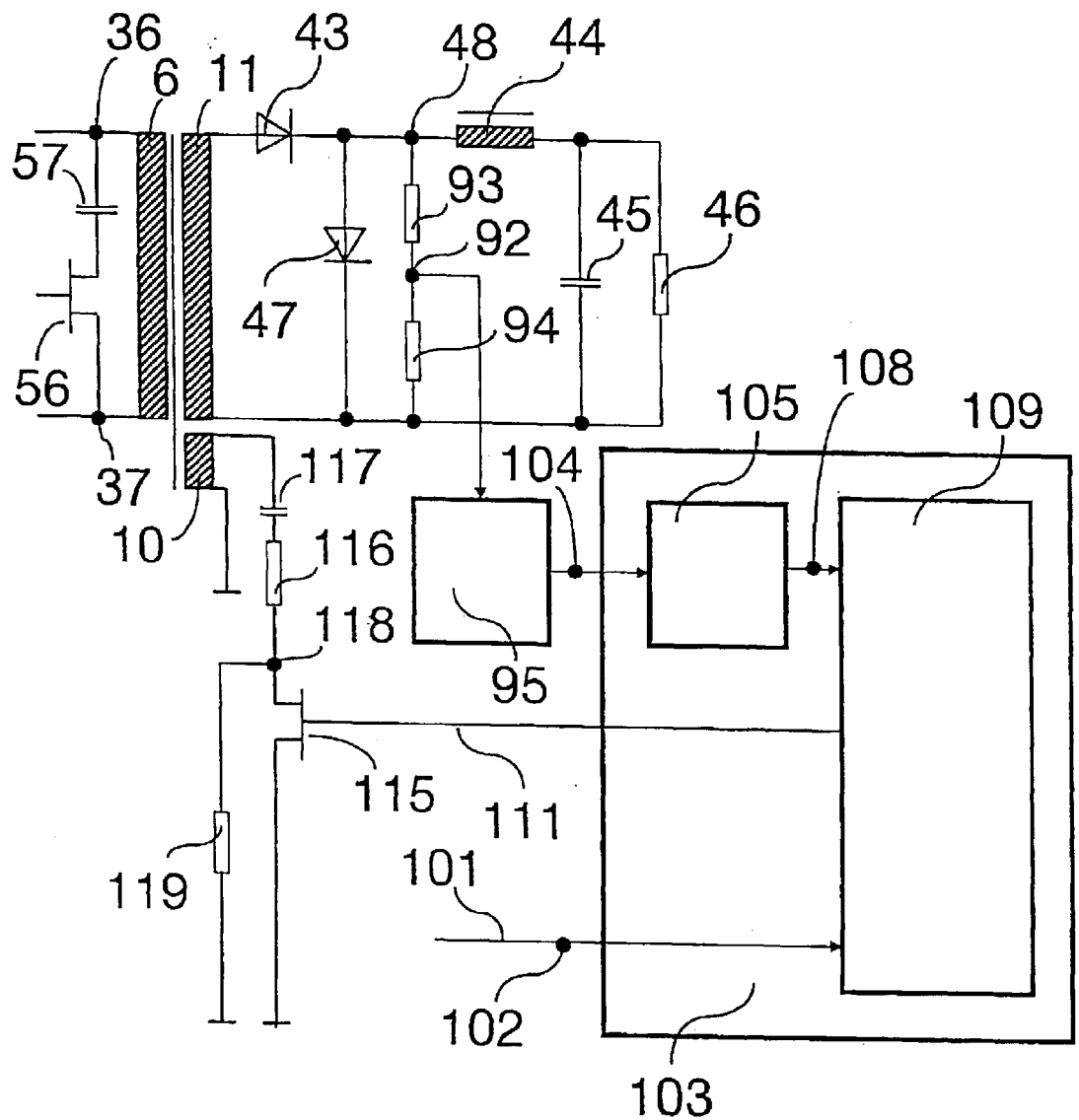
FIG. 12 shows a circuit, omitted in FIG. 6 to simplify the representation, for transferring data from the movable to the stationary component.

The data to be transferred is supplied serially over a line 101 in FIG. 12, in which like parts are denoted by the same reference numerals as in FIG. 6, this line being connected through an RS 232 interface for example to the output of a controller or the like provided on the rotatable component 18. The supply of the data is also effected here at a baud rate of 7800 bits/s for example, i.e. with a frequency which is smaller than the frequency of the switch signals 42.

Figure 13:
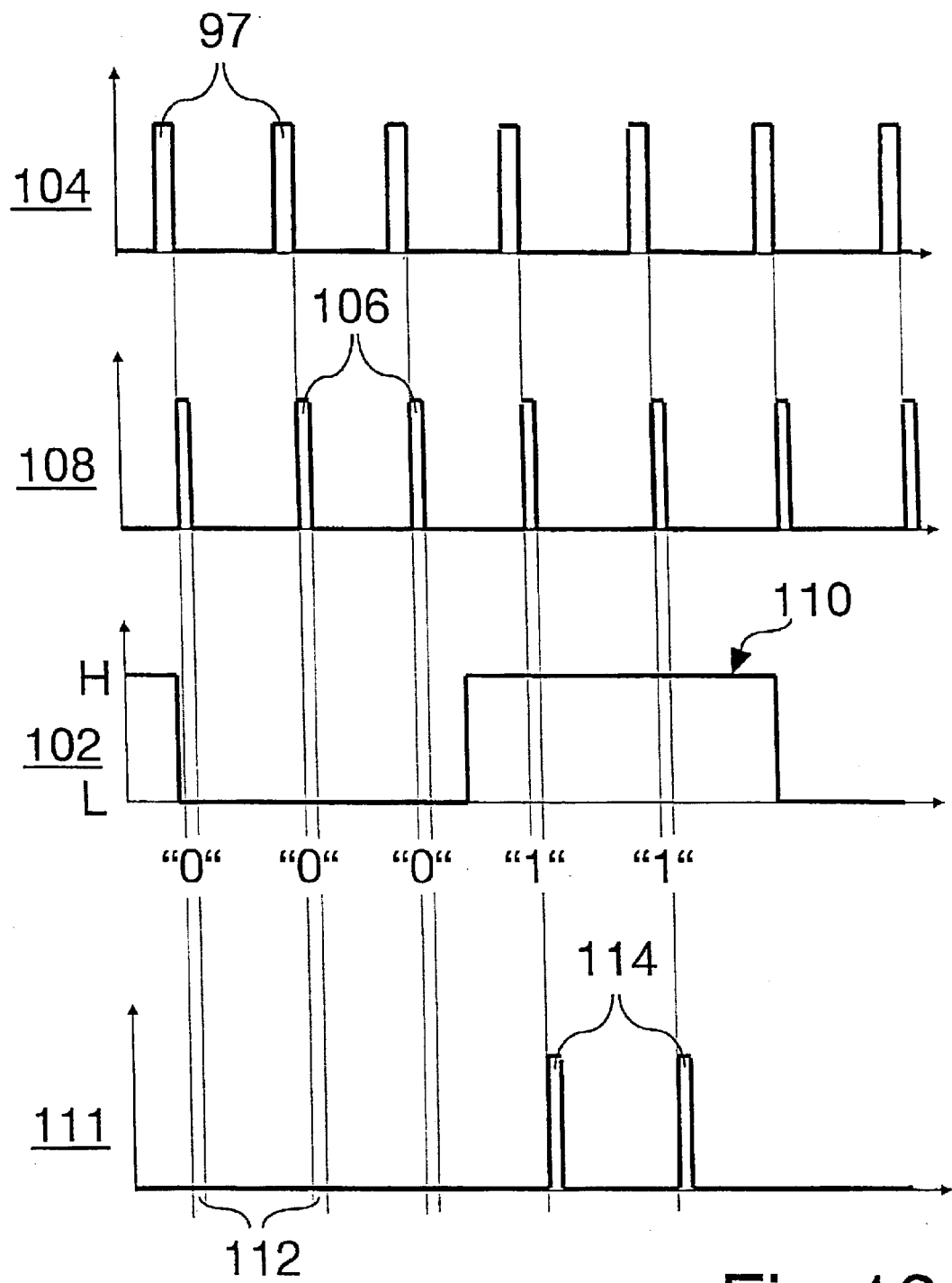
FIGS. 13 and 14 show pulse waveforms at selected nodes of the circuit according to FIG. 12.

The data is firstly fed to an input 102 of a circuit arrangement 103 which has a second input 104 to which are applied the signals arising at the terminal 92 (FIG. 10), after they have been reduced in the block 95 to the necessary logic level and therefore correspond to the signals 97 in FIG. 11 (cf. also FIG. 13). These signals are first transformed in a delay circuit 105 into delayed signals 106 (FIG. 13), which are applied to an input 108 of a circuit 109. The delayed signals 106 result in that a pulse generator, not shown, is triggered by the negative flanks of the signals 97 and issues a signal 106 for each of these.

The circuit 109 serves substantially the same purpose as the circuit 74 (FIG. 6), namely to inspect the logical state of data appearing in the form of a signal train 110 (FIG. 13) at the input 102. The signal train 110 has a form according to FIG. 13 which corresponds essentially to the form of the signal train 83 at the input 79 (cf. FIGS. 6 and 8). If the signal train 110 is at the level L at the instant of the negative flank of a delayed signal 106, a logical "0" is recognised and no pulse, i.e. a logical "0" is generated at an output 111 of the circuit 109 (FIGS. 12, 13), as is indicated at points 112 in FIG. 13. However, if the signal train 110 is in the H state at the instant of the negative flank of the signal 106, a logical "1" is recognised and a switch signal 114 (FIG. 13) corresponding to a logical "1" is generated by the circuit 109.

The output 111 of the circuit arrangement 103 is according to FIG. 12 connected to the control input of an electric switch 115, e.g. a switch transistor. This switch 115 is connected between ground and a first terminal of a resistor 116, whose other terminal is connected in series with a terminal of a capacitor 117. The other terminal of the capacitor 117 is connected to a terminal of the auxiliary winding 10 of the secondary coil arrangement 2 (FIG. 1) mounted on the rotatable component. A node 118 between the switch 115 and the resistor 116 is moreover grounded through a resistor 119 acting as a voltage divider. As FIGS. 1 and 2 show the auxiliary winding 10 is coupled inductively to the two main windings 6 and 11 of the primary and secondary coil arrangements 1 and 2 respectively.

The delay of the signals 106, by means of which the signal train 110 is evaluated is so selected that these signals 106 always occur during the interval $t_{off}$ (FIG. 7) and always when the energy stored in the main winding 11 of the secondary coil arrangement in the time intervals $t_{on}$ is largely dissipated and the main winding of the secondary coil arrangement therefore has no significant reaction on the main winding 6 of the primary coil arrangement. The result of this is that energy is withdrawn from the main winding 6 of the primary coil arrangement whenever the switch 115 (FIG. 12) is brought into the conducting state by the signals 114 (FIG. 13), since a current flows briefly through the auxiliary winding 10, the capacitor 117 and the resistor 116. The voltage thereby appearing on the auxiliary winding 10 is readily measurable on the primary side on account of the absence of a reaction from the main winding 11 of the secondary coil arrangement on the primary side.

The signals 106 and therefore also the signals 114 (FIG. 13) are always generated according to the above description when a pulse pause is present between the signals 97 at the nodes 92 and 104 or, with other words, when the switch 38 (FIG. 6) is switched off and the switch 56 is switched on.

Figure 14:
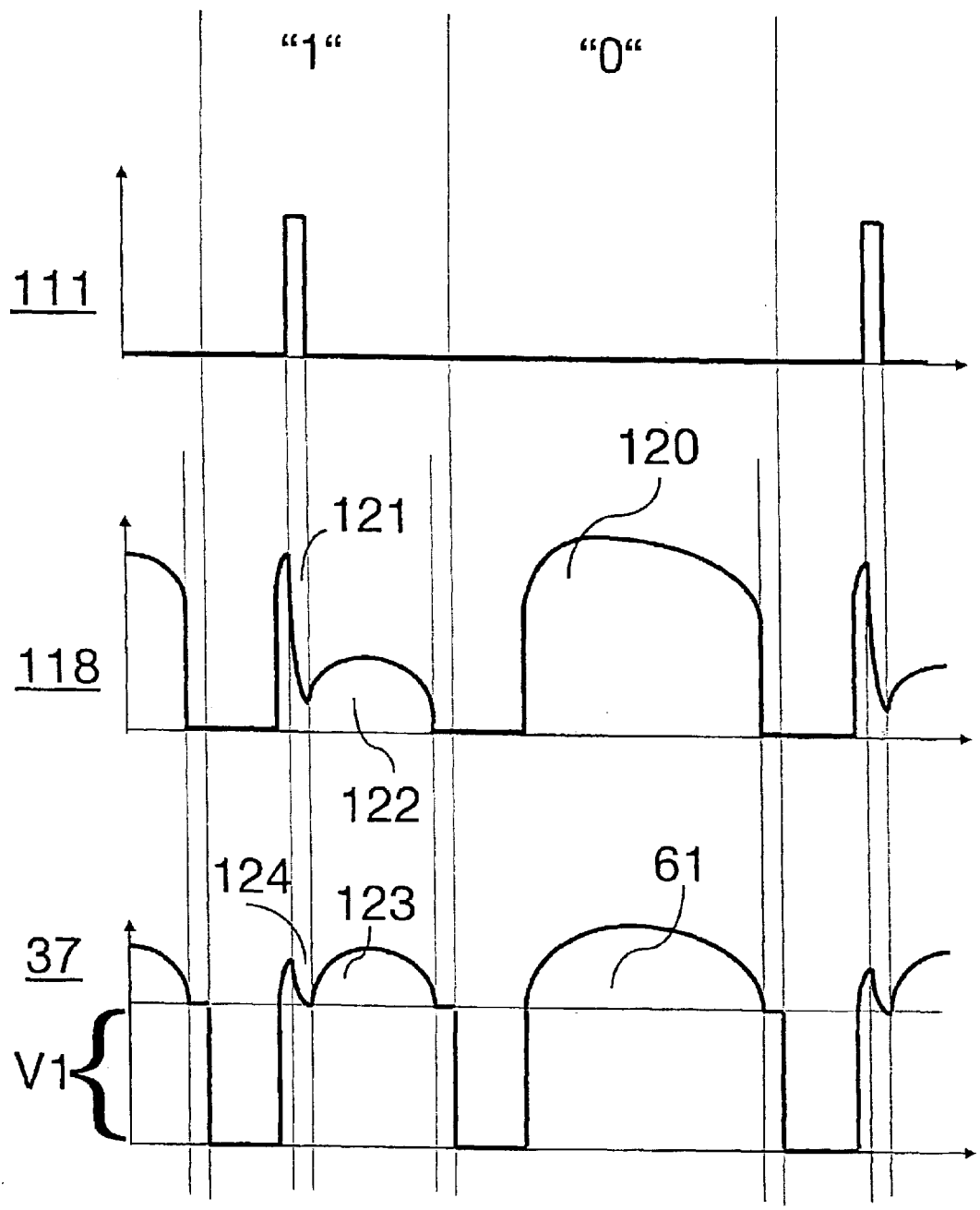

The described switching-on of the switch 115 in FIG. 12 acts at the node 118 approximately in the manner seen in FIG. 14. If the switch 115 is in the blocked state, corresponding to a "0" at the output 111, a signal 120 at the node 118 follows a course which is similar to the course of the signals 61 at the node 37 (FIGS. 6, 7 and 12) and is caused by the back voltage. If however the switch 115 is in the conductive state corresponding to a "1" at the output 111, the auxiliary winding 10 is briefly loaded, so that a characteristic notch 121 results in the leading region of the signal 120. The overall signal 122 resulting therefrom differs relatively strongly from the signal 120. A corresponding modification results at the node 37 (FIGS. 12 and 14) located on the stationary component, on account of the inductive coupling, whereby the signals 61 (FIG. 7) are transformed into the signals 123 (FIG. 14), which are also characterized by a characteristic voltage notch 124 in the leading region.

In the transfer of data from the rotatable component to the stationary component the "0" signals thus leave the signals 61 in FIG. 7 resulting from the back EMF substantially unchanged, while "1" signals result in a modification of the back EMF and therefore change the signals 61 into the signals 123. This change is measured in accordance with the invention by means mounted on the stationary component and described below with reference to FIGS. 15 and 16, and is used to recover the information fed to the input 102 (FIG. 12) from the modified back EMF.

According to FIG. 15, in which the like parts are again provided with the same reference numerals as in FIG. 6, a subtracting circuit 127 is connected to the node 37 and serves to subtract the DC voltage component (voltage V1 of the voltage source 35 in FIG. 6) explained with reference to FIG. 7 from the signals 61 and 123 in FIG. 14, whereby signals 128 corresponding to a logical "1" and 129 corresponding to a logical "0" shown to a larger scale in FIG. 16 occur, wherein the signals 128 have a notch 130 like the signals 122 and 123 in FIG. 14. The signals 128, 129 always appear during the $t_{off}$ phases of the switch 38 in FIG. 6 or 15, as is indicated in FIGS. 13 and 16. In order to evaluate these signals 128, 129, an output 131 of the subtracting circuit 127 is connected to an input of a circuit 132, which includes eight comparators connected in parallel, which are set to respective, different trigger levels 133 to 140 also indicated schematically in FIG. 16 and which issue signals 133a to 140a on exceeding these, which signals are also shown in FIG. 16. Thus a first comparator for example is so adjusted that it generates a signal 133a, i.e. the output which is normally at H passes to the L state, as soon as and as long as the amplitude of the signal 128, 129 exceeds a small, predetermined trigger threshold 133. A second comparator correspondingly issues a signal 134a which passes into the L state as soon as and as long as the amplitude of the signal 128, 129 has exceeded a somewhat higher threshold value 134. As FIG. 16 shows, the result of this is, on account of the notch 130, that the signal 134a passes into the state L twice during one period of the signal 128, between which states L however it briefly assumes the H state, whereas it only passes from the state H into the state L once within one period of the signal 129. The same applies for the signals 135a to 139a. In the example the signal 140a results in only one transition from H to L in the signal 129 but in no such transition in the signal 128.

The output signals 134a to 140a of the comparators of the circuit 132 are fed on a corresponding number of outputs 142 to a counter circuit 143, which has eight counters, whose count inputs are each connected to a respective one of the outputs 142. The counters are reset by positive flanks and restarted by negative flanks of signals which appear at the output of the circuit 81 also seen in FIG. 6 and correspond to signals 82 (FIG. 8) which are derived from the switch signals 42 (FIG. 7) and are also fed to the input 80. The count cycles thus always begin at the beginning of the switched-off cycles $t_{off}$ of the switched mode power supply and the counters are advanced by each negative flank of the signals 133a to 140a by one count step each.

On reset of the counters their count results are transferred over a corresponding number of outputs 144 (FIG. 15) to a logical evaluating unit 145. The count results can amount to 0, 1 or 2, depending on the case. In the case of a signal 129 all counters will for example display the result "1", while in the case of a signal 128 the signals 133a and 138a and 139a each lead to a counter result of "1", whereas the signals 134a to 137a each lead to a counter result of "2". A counter result of "0" would be obtained by the trigger threshold 140 lying above the trigger threshold 139 in the case of evaluating a signal 128.

The logical evaluating unit 145 is for example so constructed that it issues a logical "1" at an output 146 when at least two counters assume the counter state "2" during a period T. If however only one counter or even no counter attain the counter state "2" or if only counter states "1" are obtained, a logical "0" is issued on the output 146. Accordingly a logical "1" corresponds with high certainty to recognition of a signal 128 and a logical "0" to recognition of a signal 129. Naturally other associations can also be used for the evaluation and more or less than eight counters be used.

The signal train appearing at the output 146 is illustrated in FIG. 16. It can be seen from this that a logical "1" contained in the signal 128 is reproduced at the output 146 delayed by one clock period (signal section 147 in FIG. 16), because it is only determined at the end of the signal 128 which counter states this signal 128 has led to in the counter circuit 143 when using the described evaluating unit 145. A "0" signal 129 is correspondingly reproduced at the output 146 (signal section 148) delayed by one clock period. This displacement of the data train by one clock period is harmless, like the displacement of the data train which is transferred from the stationary component to the rotatable component, on account of the preferred asynchronous data transfer, because possibly present start and stop bits or the like are not lost.

Figure 15:
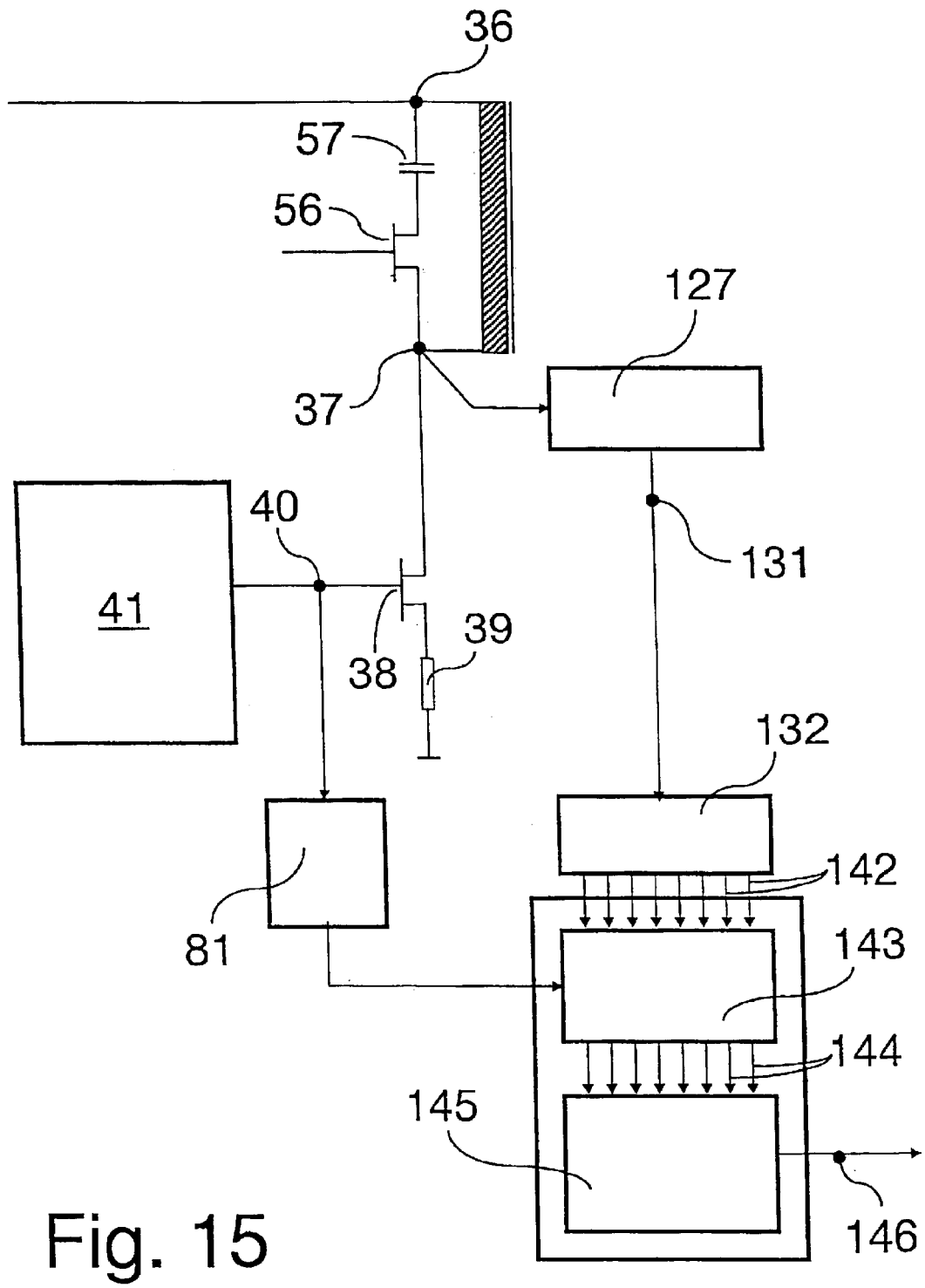
FIG. 15 shows a circuit, omitted in FIG. 6 to simplify the representation, for recovering data which has been transferred by the apparatus according to FIG. 5 from the movable to the stationary component.
Figure 16:
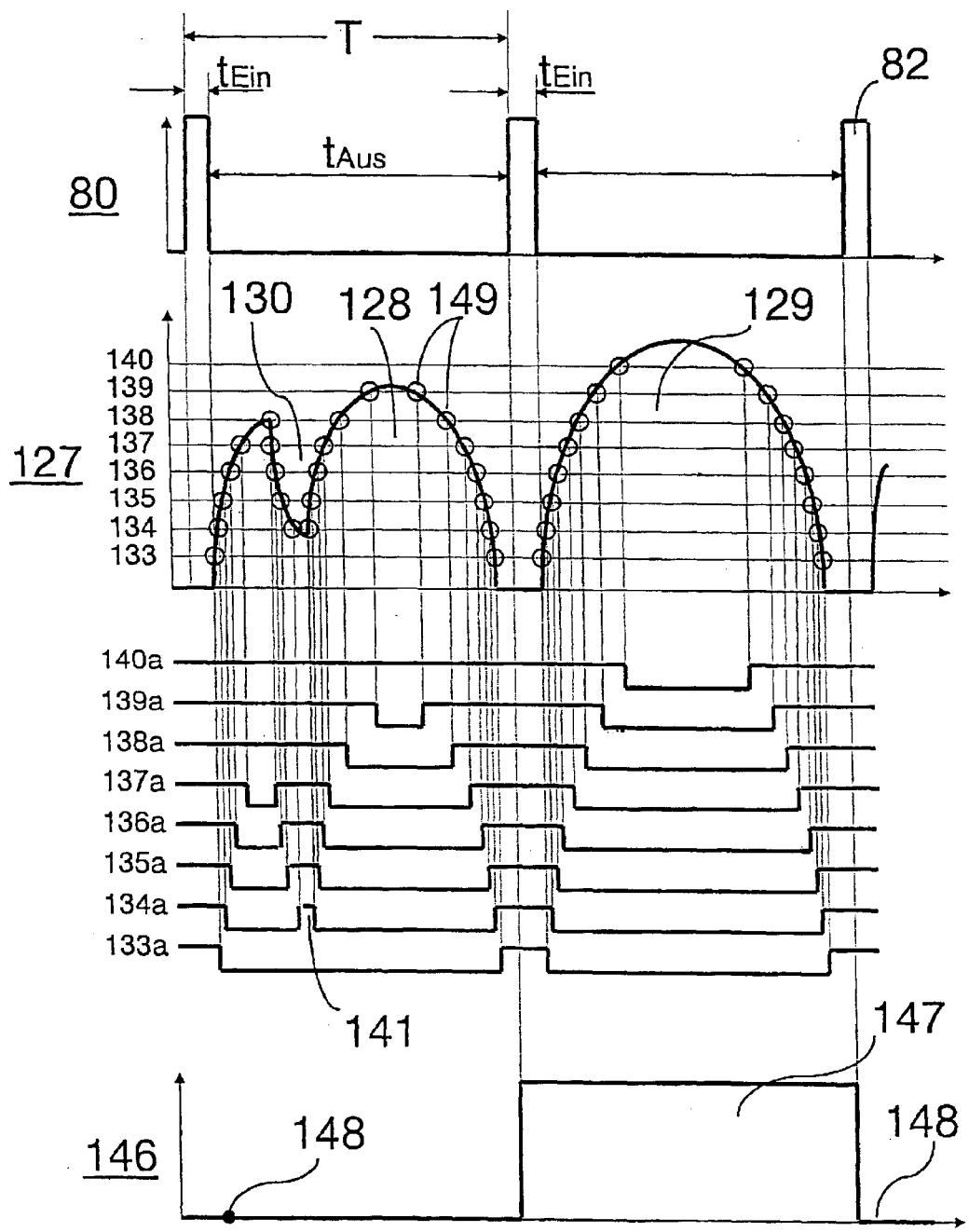
FIG. 16 shows pulse waveforms at selected nodes of the circuit according to FIGS. 15.

The described transfer of data from the secondary side to the primary side is moreover independent on whether the switch signals 82 in FIGS. 15 and 16 have the short or long period T1 or T2 (FIG. 9) on account of a simultaneous data transfer in the opposite direction, or whether the instantaneous duty cycles $t_{on}/T$ are larger or smaller, since the transfer always takes place only during the pulse pauses of the switch signals.

In an embodiment considered the best at present, the various blocks are implemented by the following IC circuits obtainable in the market:

| | |
|---|---|
| Block 41: | L 4990A |
| Block 59: | L 6380 |
| Blocks 88, 89, 103, 143, 145: | IC 9572 |
| Block 127: | LM 6142 |
| Block 132: | MAX 942 |
| Blocks 81, 95: | 74 HC 14. |

The invention is not limited to the described embodiments, which can be modified in numerous ways. This applies in particular to the described evaluating units. It would be possible for example to sample the signals 128, 129 with a fast digital signal processor and measure their amplitudes at a plurality of points 149 (FIG. 16) with an analog/digital converter. These measured values could then be used to detect the notches 130 and therefore distinguish a logical "1" from a logical "0". It is further possible to effect the data transfer from the primary to the secondary side simultaneously with the data transfer from the secondary to the primary side, since the described modifications of the frequencies or the back voltages do not interfere with each other. Accordingly a "0" or a "1" can be transferred both in the one and in the other direction during each period T. It is clear that the associations are arbitrary, i.e. in FIGS. 11 and 16 the signals 27a or 128 could be evaluated as "0" and the signals 97b or 129 as logical "1". In each case there is the advantage that the same switched mode power supply and the same transfer device or parts thereof can be used to transfer both the power and the information and the two kinds of transfer do not impede each other.

Furthermore the transfer devices explained with reference to FIGS. 1 to 5 only represent examples, which can be modified as is appropriate and be provided with other than the described windings. This applies in particular when other textile machines such as flat bed knitting machines for example are involved, in which a movable carriage is provided, which imposes a linear relative movement on a needle bed, so that the described inductive coupling between the primary and the secondary coil arrangements must be present over the whole carriage stroke. The expression "movable" should therefore preferably include all relative movements between the two components 16 and 18 in FIG. 1, and even both components could be movable. Furthermore the number of trigger stages shown in FIGS. 15 and 16 is arbitrary, insofar as only a "0" can be distinguished from a "1". It would in this connection also be possible firstly to generate envelope curves for the signals 128, 129 and adapt the trigger thresholds automatically to the level of the back EMF arising in each case. Furthermore the given frequencies and voltages can be varied within wide limits. It is moreover clear that other than the described hardware and/or software components can be used to realise the described power and information transfer and in particular the evaluation of the transferred data can be effected predominantly with the aid of special software. Furthermore, instead of the described asynchronous data transfer synchronous data transfer can naturally also be provided, in that buffer stores are provided to receive arbitrarily rapidly arriving data, this data then being read out of the buffer store at the frequency or clock cycle of the switched mode power supply. Finally it will be understood that the various features can also be utilised in other than the described and illustrated combinations.

It will be understood, that each of the elements described above or two or more together, may also find a useful application in other types of constructions differing from the types described above.

While the invention has been illustrated and described as embodied in a knitting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. Apparatus having a first component (16), a second component (18), both components (16, 18) being movable relative to each other, and a device for simultaneous transfer of electric power and information between said components (16, 18) through contact-free, inductive coupling, wherein said device comprises a common transfer means for transfer of the power and the information and having a primary coil arrangement (1) mounted on said first component (16) and a secondary coil arrangement (2, 27) mounted on said second component (18), a power supply being connected to said primary coil arrangement (1, 24), being based on pulse width modulation and being operated at a predetermined clock frequency and with a predetermined duty cycle, and modifying means (71, 72 or 10, 115 to 119) for modifying of signals generated by said power supply in dependence of said information to be transferred.

2. Apparatus according to claim 1, wherein said primary and said secondary coil arrangements (1, 24; 2, 27) each comprises a common core with two core halves (3, 8; 25, 28) separated by an air gap (15; 32).

3. Apparatus according to claim 1, wherein said primary and secondary coil arrangements (1, 24; 2, 27) each includes a main and an auxiliary winding (6, 11 and 5, 10 respectively).

4. Apparatus according to claim 3, wherein said main winding (6) of said primary coil arrangement (1) is connected to a DC voltage source (35) and an electronic switch (38) and wherein said power supply comprises a PWM controller (41) for switching said switch (38) on and off.

5. Apparatus according to claim 4, wherein said modifying auxiliary winding (5) of said primary coil arrangement (1) is arranged to generate a signal which serves to alter said duty cycle in dependence on the value of a load (46) connected to said secondary coil arrangement (2).

6. Apparatus according to claim 1, wherein said modifying means include a device (71, 72) disposed on said first component (16) for modifying said clock frequency in dependence on said information to be transferred from said first component (16) to said second component (18).

7. Apparatus according to claim 6, wherein said means (88 to 96) are provided on said second component (18) for recovering said information from said modified frequency.

8. Apparatus according to claim 1, wherein said modifying means include said auxiliary winding (10) of said secondary coil arrangement (2).

9. Apparatus according to claim 8, wherein said auxiliary winding (10) of said secondary coil arrangement (2) is arranged to modify a back EMF arising in said main winding (6) of said primary coil arrangement (1) in operation of said the power supply.

10. Apparatus according to claim 9, wherein said auxiliary winding (10) of said secondary coil arrangement (2) forms a series circuit with a switch (115) which can be switched in dependence on said information to be transferred from said second component (18) to said first component (16).

11. Apparatus according to claim 10, wherein said means (127 to 146) are provided on said first component (16) for recovering information from said modified back EMF.

12. Apparatus according to claim 1, wherein said modifying means are so arranged that said information can be transferred bidirectionally and substantially simultaneously over said transfer device.

13. Apparatus according to claim 1, wherein said information can be transferred synchronously.

14. Apparatus according to claim 1, wherein said first component (16) is stationary and said second component is movable.

15. A circular knitting machine, being provided with an apparatus according to claim 1.

* * * * *